(12) United States Patent
Liu

(10) Patent No.: US 9,071,968 B2
(45) Date of Patent: Jun. 30, 2015

(54) METHOD, APPARATUS, AND SYSTEM FOR CENTRALIZED 802.1X AUTHENTICATION IN WIRELESS LOCAL AREA NETWORK

(71) Applicant: Huawei Technologies Co., Ltd., Shenzhen, Guangdong (CN)

(72) Inventor: Guoping Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 13/913,792

(22) Filed: Jun. 10, 2013

(65) Prior Publication Data
US 2013/0272290 A1    Oct. 17, 2013

Related U.S. Application Data

(63) Continuation of application No. PCT/CN2011/081329, filed on Oct. 26, 2011.

(30) Foreign Application Priority Data

Dec. 9, 2010    (CN) .......................... 2010 1 0581115

(51) Int. Cl.
*H04W 4/00*      (2009.01)
*H04W 12/06*     (2009.01)
*H04L 29/06*     (2006.01)

(52) U.S. Cl.
CPC ................. *H04W 12/06* (2013.01); *H04Q 7/22* (2013.01); *H04L 63/0892* (2013.01); *H04L 63/162* (2013.01); *H04L 63/205* (2013.01)

(58) Field of Classification Search
None
See application file for complete search history.

(56) References Cited

U.S. PATENT DOCUMENTS

| 2004/0087304 A1 | 5/2004 | Buddhikot et al. |
| 2005/0163078 A1 | 7/2005 | Oba et al. |
| 2006/0225129 A1* | 10/2006 | Inoue ................................. 726/3 |
| 2008/0069024 A1* | 3/2008 | Iino ................................. 370/313 |

(Continued)

FOREIGN PATENT DOCUMENTS

| CN | 1455556 A | 11/2003 |
| CN | 1505329 A | 6/2004 |
| CN | 1527557 A | 9/2004 |

(Continued)

OTHER PUBLICATIONS

"IEEE Std 802.1D™—IEEE Standard for Local and Metropolitan Area Networks; Media Access Control (MAC) Bridges," *IEEE Standards*, IEEE Computer Society, New York, New York (Jun. 9, 2004).

(Continued)

*Primary Examiner* — Kodzovi Acolatse
(74) *Attorney, Agent, or Firm* — Leydig, Voit & Mayer, Ltd.

(57) ABSTRACT

The present invention discloses a method, an apparatus, and a system for centralized 802.1X authentication in a wireless local area network, and the method includes: receiving, by the access point, an EAP authentication start message from the UE, where a destination address of the EAP authentication start message is a MAC address corresponding to an air interface of the access point, and its source address is a MAC address of the UE; modifying the destination address of the EAP authentication start message to be a multicast address of a port access entity or a MAC address of the authentication entity; and forwarding the EAP authentication start message whose destination address is modified.

6 Claims, 6 Drawing Sheets

(56) References Cited

U.S. PATENT DOCUMENTS

| | | | |
|---|---|---|---|
| 2009/0019539 A1* | 1/2009 | Jonnalagadda et al. | ........ 726/14 |
| 2010/0182983 A1 | 7/2010 | Herscovici et al. | |

FOREIGN PATENT DOCUMENTS

| | | |
|---|---|---|
| CN | 1969568 A | 5/2007 |
| CN | 101136746 A | 3/2008 |
| CN | 101232372 A | 7/2008 |
| CN | 101273649 A | 9/2008 |
| CN | 101599834 A | 12/2009 |
| CN | 102137401 A | 7/2011 |
| EP | 1693995 A1 | 8/2006 |

OTHER PUBLICATIONS

"IEEE Std 802.1X™—IEEE Standard for Local and Metropolitan Area Networks; Port-Based Network Access Control," *IEEE Standards*, IEEE Computer Society, New York, New York (Dec. 13, 2004).

"IEEE Std 802.3™—IEEE Standard for Ethernet," *IEEE Standards*, IEEE Computer Society, New York, New York (Dec. 28, 2012).

"IEEE Std 802.11n™—IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," *IEEE Standards*, IEEE Computer Society, New York, New York (Oct. 29, 2009).

Menezes et al., "Handbook of Applied Cryptography," pp. 556-558 & 572-576, 1 edition, CRC Press (Oct. 16, 1996).

Written Opinion of the International Searching Authority in corresponding PCT Patent Application No. PCT/CN2011/081329 (Feb. 16, 2012).

International Search Report in corresponding PCT Patent Application No. PCT/CN2011/081329 (Feb. 16, 2012).

\* cited by examiner

METHOD, APPARATUS, AND SYSTEM FOR CENTRALIZED 802.1X AUTHENTICATION IN WIRELESS LOCAL AREA NETWORK

CROSS-REFERENCE TO RELATED APPLICATIONS

This application is a continuation of International Patent Application No. PCT/CN2011/081329, filed on Oct. 26, 2011, which claims priority to Chinese Patent Application No. 201010581115.6, filed on Dec. 9, 2010, both of which are hereby incorporated by reference in their entireties.

TECHNICAL FIELD

The present invention relates to the field of communications technologies, and in particular, to a method, an apparatus, and a system for centralized 802.1X authentication in a wireless local area network.

BACKGROUND

The basic structure of a wireless local area network (WLAN) defined in IEEE (Institute of Electrical and Electronics Engineers) 802.11 may be shown in FIG. 1, where a station (STA) refers to a terminal device having a wireless local area network interface, and an access point (AP) is equivalent to a base station of a mobile network and is mainly responsible for implementing communication between STAs or between an STA and a relevant device of a wired network. Multiple STAs may access the same AP. STAs associated with the same AP constitute a basic service set (BSS). A distribution system (DS) is used to form a large local area network between different BSSs as well as between a BSS and a wired local area network. A portal device is a logical point for providing data forwarding between a DS and a wired local area network.

In a WLAN system, the service set identifiers (SSID) are generally used to distinguish different wireless local area networks. When different BSSs (which may be identified by using BSSIDs) form a large local area network through a DS, the different BSSs have the same SSID.

Conventionally, a WI-FI protected access (WPA) security mechanism recommended by the wireless fidelity certification (WI-FI, wireless fidelity) alliance is widely applied in a WLAN. The WPA enterprise version (generally referred to various WPA enterprise versions) is implemented based on the 802.1X authentication protocol. A network structure of the 802.1X authentication may be divided into three parts, including an authentication-applying party (that is, a user port access entity, i.e., a user equipment (UE), which in a WLAN may be referred to as an STA), an authentication system, i.e., an authentication entity (AE), and an authentication server (AS).

By default, an AE only allows an authentication message of a UE to pass at the beginning, and the AE allows a service message of the UE to pass only after the UE is authenticated. In a WLAN network, an AS is a remote authentication dial in user service (Radius, Remote Authentication Dial In User Service) server, the AE generally corresponds to an AP, and the UE is an STA.

In an authentication process, an authentication message is transferred between an STA and an AP. There is an association process between the STA and the AP before the authentication starts in a WLAN. Therefore, the STA and the AP both have learnt an air interface media access control (MAC) address (such as a BSSID) of a peer end before the authentication. Therefore, the IEEE 802.1X protocol specifies that in a WLAN network, all Extensive Authentication Protocol (EAP) authentication messages (including a first message) of a UE must use unicast addresses.

In a WLAN specified in the IEEE 802.1X, a prerequisite for all EAP authentication messages to use the unicast addresses is that an AE must be an AP device (a UE may learn the MAC address (such as a BSSID) corresponding to an air interface of the AP in a process of associating with the AP). A WLAN in a scenario such as a home or a small enterprise may satisfy this condition because the quantity of APs is limited in the scenarios where small amount of work is required for configuring each AP as an AE. This authentication deployment mode may be referred to as distributed authentication deployment.

As the technologies develop, a large number of large WLANs suitable for a large enterprise or operator are deployed, and a large WLAN has a huge number of APs. To ease management burden, thin AP networking is generally used at present. In this case, an AE device may be deployed on an access controller (AC) or deployed on a multi-service control gateway (MSCG) device on the AC. The authentication deployment mode of deploying an AE device on a device such as an AC or an MSCG in a centralized way may be referred to as centralized authentication deployment.

The prior art has at least the following problems: An AE in centralized authentication deployment is not an AP device; therefore, a UE cannot learn a MAC address of the AE before authentication. However, the IEEE 802.1X protocol specifies that all EAP authentication messages (including a first message) of a UE must use unicast addresses. In such a case, the authentication cannot be completed according to the existing mechanism.

SUMMARY

Embodiments of the present invention provide a method, an apparatus, and a system for centralized 802.1X authentication in a wireless local area network, thereby implementing centralized 802.1X authentication for a UE in a wireless local area network.

In order to solve the foregoing technical problems, the embodiments of the present invention provide the following technical solutions.

A method for centralized 802.1X authentication in a wireless local area network is provided, where the wireless local area network includes an authentication entity, an access point, and at least one user equipment UE, the authentication entity is connected to the at least one UE through the access point. The method includes:

receiving, by the access point, an extensive authentication protocol EAP authentication start message from the UE, where a destination address of the EAP authentication start message is a media access control MAC address corresponding to an air interface of the access point, and its source address is a MAC address of the UE;

modifying the destination address of the EAP authentication start message to be a multicast address of a port access entity or a MAC address of the authentication entity; and forwarding the EAP authentication start message whose destination address is modified, so that the authentication entity starts access authentication for the UE according to the EAP authentication start message whose destination address is modified.

A method for centralized 802.1X authentication in a wireless local area network includes:

generating, by an access point, an EAP authentication start message, where a destination address of the EAP authentication start message is a multicast address of a port access entity or a MAC address of an authentication entity, and its source address is a MAC address of a UE;

sending the EAP authentication start message;

receiving an EAP authentication message sent by the authentication entity, where a source address of the EAP authentication message is the MAC address of the authentication entity, and its destination address is the MAC address of the UE; and modifying the source address of the EAP authentication message to be a MAC address corresponding to an air interface of the access point, and forwarding the EAP authentication message with the modified source address to the UE.

An Access Point Device Includes:

a first receiving module, configured to receive an EAP authentication start message sent by a UE, where a destination address of the EAP authentication start message is a MAC address corresponding to an air interface of an access point, and its source address is a MAC address of the UE;

a first address-modifying module, configured to modify the destination address of the EAP authentication start message received by the first receiving module to be a multicast address of a port access entity or a MAC address of an authentication entity; and a first forwarding module, configured to forward the EAP authentication start message whose destination address is modified by the first address-modifying module, so that the authentication entity starts access authentication for the UE according to the EAP authentication start message whose destination address is modified.

A system for centralized 802.1X authentication in a wireless local area network is provided, where the wireless local area network includes an authentication entity, an access point, and at least one user equipment UE, the authentication entity is connected to the at least one UE through the access point, where the access point is configured to receive an extensive authentication protocol EAP authentication start message sent by the UE, where a destination address of the EAP authentication start message is a media access control MAC address corresponding to an air interface of the access point, and its source address is a MAC address of the UE; modify the destination address of the EAP authentication start message to be a multicast address of a port access entity or a MAC address of the authentication entity; and forward the EAP authentication start message whose destination address is modified, so that the authentication entity starts access authentication for the UE according to the EAP authentication start message whose destination address is modified.

According to the above description, in one technical solution provided by the embodiments of the present invention, after receiving, from a UE, an EAP authentication start message whose destination address is a MAC address corresponding to an air interface of the access point, an access point in centralized authentication deployment modifies the destination address of the message to be a MAC address of an authentication entity, and forwards the EAP authentication start message whose destination address is modified, so that the EAP authentication start message may reach the authentication entity instead of being stopped at the access point, so as to trigger an access authentication process for the UE and implement centralized 802.1X authentication for the UE in a wireless local area network. In addition, this mechanism allows the UE to send all EAP authentication messages in unicast mode according to the specification of the IEEE 802.1X protocol; therefore, it is unnecessary to modify an authentication program that is built in the UE and based on the IEEE 802.1X protocol mechanism.

In another technical solution provided by embodiments of the present invention, an access point in centralized authentication deployment generates and sends an EAP authentication start message whose source address is a MAC address of a UE and whose destination address is a MAC address of an AE, to act as a proxy for the UE to initiate an access authentication process, so that the EAP authentication start message may reach an authentication entity, so as to trigger an access authentication process for the UE and implement centralized 802.1X authentication for the UE in a wireless local area network. Further, this mechanism allows a UE to send all EAP authentication messages in unicast mode according to the specification of the IEEE 802.1X protocol; therefore, it is unnecessary to modify an authentication program that is built in the UE and based on the IEEE 802.1X protocol mechanism.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

Embodiments of the present invention provide a method, an apparatus, and a system for centralized 802.1X authentication in a wireless local area network.

To make the objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
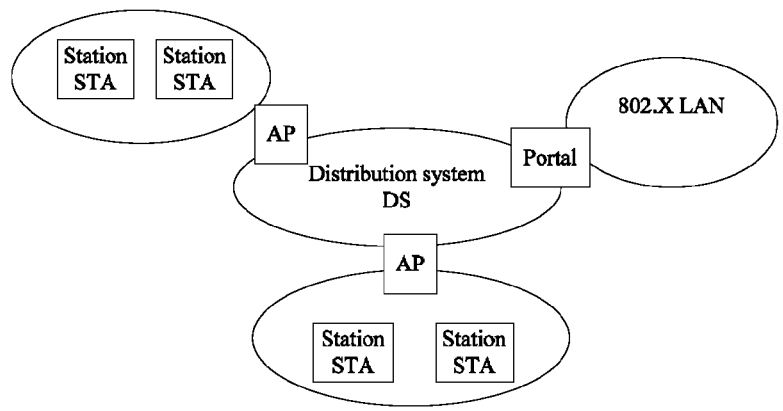
FIG. 1 is a schematic diagram of a basic structure of a WLAN defined in 802.11.
Figure 2:
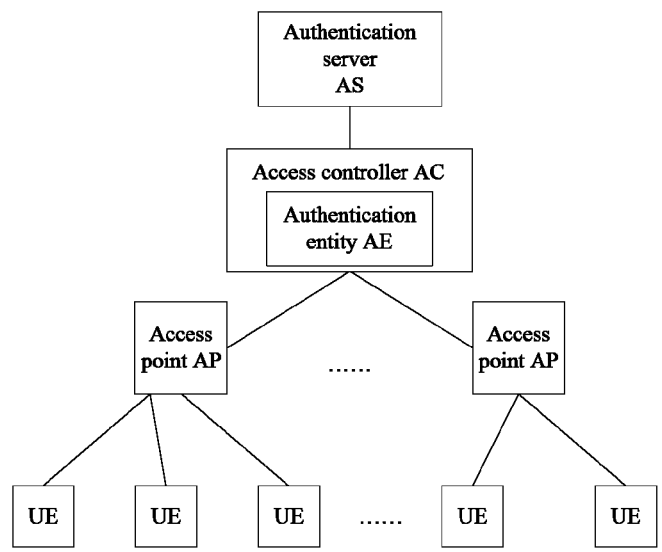
FIG. 2 is a schematic diagram of a topology of a centralized deployment authentication network according to an embodiment of the present invention.

Referring to FIG. 2, a schematic diagram of a topology of a centralized deployment authentication network according to an embodiment of the present invention is illustrated. Multiple UEs may be associated with one AP; multiple APs are then connected to one access controller AC; and an AE device may be deployed on the AC or deployed on a multi-service control gateway MSCG device on the AC. FIG. 2 shows a scenario where an AE device is deployed on an AC. The AE device is associated with an AS to form centralized authentication deployment. Technical solutions according to the embodiments of the present invention may be specifically implemented based on an authentication network of a topology structure illustrated in FIG. 2 or an authentication network of a similar centralized deployment structure.

Detailed description is given as follows.

Embodiment 1

In an embodiment illustrating a method for centralized 802.1X authentication in a wireless local area network according to the present invention, a wireless local area network includes an AE, an AP, and at least one UE, where the AE is connected to the at least one UE through the AP, and the method may include: receiving, by the AP, an EAP authentication start message sent by the UE, where a destination address of the EAP authentication start message is a media access control (MAC, Media Access Control) address corresponding to an air interface of the AP, and its source address is a MAC address of the UE; modifying the destination address of the EAP authentication start message to be a multicast address of a port access entity (PAE, Port Access Entity) or a MAC address of the AE; and forwarding the EAP authentication start message whose destination address is modified, so that the AE starts access authentication for the UE according to the EAP authentication start message whose destination address is modified.

Figure 3:
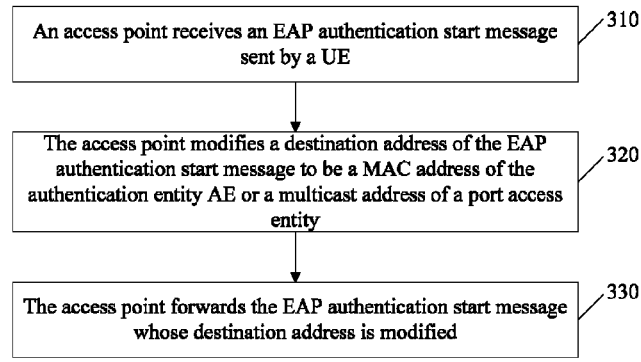
FIG. 3 is a schematic flowchart of a method for centralized 802.1X authentication in a wireless local area network according to Embodiment 1 of the present invention.

Referring to FIG. 3, the following specific steps may be included.

310. An AP receives an EAP authentication start message sent by a UE, where a destination address of the EAP authentication start message is a MAC address corresponding to an air interface of the AP, and its source address is a MAC address of the UE.

In an application scenario, a UE may initiate an authentication request by sending an EAP authentication start message (EAPOL-Start message), thereby requesting a network side to perform access authentication.

Before the UE initiates authentication, there is a process of associating with the AP, and the UE and the AP both learn a media access control MAC address of a peer end before the authentication. Therefore, the UE may send the EAP authentication start message in unicast mode according to the specification of the IEEE 802.1X protocol, where the MAC address of the AP carried in the EAP authentication start message may be a BSSID or another distinguishing identifier.

320. The AP modifies the destination address of the EAP authentication start message to be a MAC address of an AE or a multicast address of a PAE.

When the AP monitors that the destination address of the received EAP authentication start message is the MAC address (such as a BSSID) corresponding to the air interface of the AP, the AP does not stop the EAP authentication start message there, but continues to forward it after modifying its destination address.

In a practical application, if the MAC address of the AE in advance is configured for the AP, the AP may modify the destination address of the received EAP authentication start message to be the MAC address of the AE; if the AP does not learn the MAC address of the AE at this time, the AP may modify the destination address of the received EAP authentication start message to be a multicast address of the PAE, where the EAP authentication start message whose destination address is the multicast address of the PAE may also be detected and received by the AE.

330. The AP forwards the EAP authentication start message whose destination address is modified.

Correspondingly, the AE may receive the EAP authentication start message whose destination address is modified, thereby learning that the UE requests access authentication; and the AE may respond according to a standard authentication process to start access authentication for the UE.

In an application scenario, if the AP further receives an EAP authentication message (such as an EAP request message (EAP-Request message) for requesting the identity of a UE or another message) sent by the AE, where a source address of the EAP authentication message is the MAC address of the AE, and its destination address is the MAC address of the UE, the AP may modify the source address of the EAP authentication message to be the MAC address (such as a BSSID) corresponding to the air interface of the AP, and forward the EAP authentication message with the modified source address to the UE. In this case, because the source address of the EAP authentication message that is forwarded by the AP and received by the UE is the MAC address (such as a BSSID) corresponding to the air interface of the AP, the UE may still use the AP as an AE to continue the EAP authentication. If the AP further receives a second EAP authentication message sent by the UE, where the second EAP authentication message is an authentication message (the second EAP authentication message is, for example, an EAP response (EAP-Response) message carrying a UE identity (ID) or another EAP authentication message) sent by the UE except the EAP authentication start message, a destination address of the second EAP authentication message is the MAC address (such as a BSSID) corresponding to the air interface of the AP, and its source address is the MAC address of the UE, the AP may modify the destination address of the second EAP authentication message to be the MAC address of the AE, and forward the second EAP authentication message whose destination address is modified. In other words, the AP may modify source addresses or destination addresses of all EAP authentication messages communicated between the UE and the AE, modify the destination address of the EAP authentication message from the UE to be the MAC address of the AE, and modify the source address of the EAP authentication message from the AE to be the MAC address (such as a BSSID) corresponding to the air interface of the AP; and the UE may always regard the AP as an AE for EAP authentication. Because the UE learns the MAC address (such as a BSSID) corresponding to the air interface of the AP before the authentication, the UE may send all EAP authentication messages in unicast mode according to the specification of the IEEE 802.1X protocol.

In another application scenario, if the AP further receives a third EAP authentication message (such as an EAP request message (EAP-Request message) for requesting the identity of a UE or another message) sent by the AE, where a source address of the third EAP authentication message is the MAC address of the AE, and its destination address is the MAC address of the UE, the AP may not modify the source address or destination address of the third EAP authentication message, but directly forward the third EAP authentication message to the UE, so that the UE learns the MAC address of the AE from the third EAP authentication message. In this scenario, after receiving the third EAP authentication message, the UE may learn the MAC address of an actual AE, and may communicate with the AE about other EAP authentication messages by using the learned MAC address of the AE subsequently, thereby completing the access authentication. In other words, the AP may only modify the destination address only of the EAP authentication start message (a first EAP authentication message from the UE), but not modify the source address or destination address of an EAP authentication start message communicated between the UE and the AE subsequently; and the UE may learn the MAC address of the AE according to a response of the AE to the EAP authentication start message, so that the UE may send all EAP authentication messages in unicast mode according to the specification of the IEEE 802.1X protocol.

It should be noted that the UE mentioned in the embodiment of the present invention may be various terminal devices having wireless local area network access capacity, such as a mobile phone and a portable computer; and the AP may be various devices having a wireless access function. The solution according to the embodiment of the present invention mainly involves modifying, by the AP, the source/destination addresses of partial or all EAP authentication messages communicated between the UE and the AE, and an authentication signaling message communicated between the AE and an AS may be the same as or similar to a standard process. It may be understood that under 802.1X authentication architecture, various EAP authentication algorithms may be selected according to requirements, such as an authentication algorithm like EAP-PEAP (EAP-Protected Extensible Authentication Protocol, extensive authentication protocol-protected extensible authentication protocol), EAP-SIM/AKA (EAP-Subscriber Identity Module/Authentication and Key Agreement, extensive authentication protocol-subscriber authentication module/authentication and key agreement), and EAP-TLS (extensive authentication protocol-transport layer security protocol, EAP-Transport Layer Security Protocol). However, authentication under the authentication architecture of 802.1X is not affected by different EAP authentication algorithms.

According to the above description, in the embodiment, after an AP in centralized authentication deployment receives, from a UE, an EAP authentication start message whose destination address is a MAC address (such as a BSSID) corresponding to an air interface of the AP, the AP modifies the destination address of the message to be a MAC address of an AE, and forwards the EAP authentication start message whose destination address is modified, so that the EAP authentication start message may reach the AE instead of being stopped at the AP, so as to trigger an access authentication process for the UE and implement centralized 802.1X authentication for the UE in a wireless local area network. Further, this mechanism allows the UE to send all EAP authentication messages in unicast mode according to the specification of the IEEE 802.1X protocol; therefore, it is unnecessary to modify an authentication program that is built in the UE and based on the IEEE 802.1X protocol mechanism.

Embodiment 2

In another embodiment illustrating a method for centralized 802.1X authentication in a wireless local area network according to the present invention, a wireless local area network includes an AE, an AP, and at least one UE, where the AE is connected to the at least one UE through the AP, and the method may include: generating, by the AP, an EAP authentication start message, where a destination address of the EAP authentication start message is a multicast address of a PAE or a MAC address of the AE, and its source address is a MAC address of the UE; sending the EAP authentication start message; receiving an EAP authentication message sent by the AE, where a source address of the EAP authentication message is the MAC address of the AE, and its destination address is the MAC address of the UE; and forwarding the EAP authentication message to the UE, so that the UE learns the MAC address of the AE from the EAP authentication message; or modifying the source address of the received EAP authentication message to be a MAC address corresponding to an air interface of the AP, and forwarding the EAP authentication message whose destination address is modified to the UE.

Figure 4:
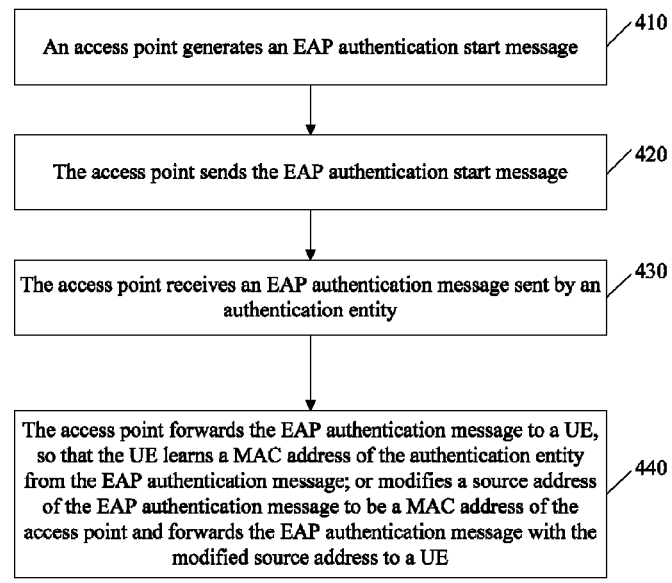
FIG. 4 is a schematic flowchart of a method for centralized 802.1X authentication in a wireless local area network according to Embodiment 2 of the present invention.

Referring to FIG. 4, the following specific steps may be included.

410. An AP generates an EAP authentication start message, where a destination address of the EAP authentication start message is a multicast address of a PAE or a MAC address of an AE, and its source address is a MAC address of a UE.

In some application scenarios, a UE does not actively initiate 802.1X authentication after being associated with an AP, that is, does not actively sends an EAPOL-Start message. In this case, the AP may send an EAPOL-Start message as a proxy of the UE to the AE, to trigger 802.1X authentication.

420. The AP sends the EAP authentication start message.

In the embodiment, the AP initiates an authentication request as a proxy of the UE, to request a network side to perform access authentication for the UE. The AP generates and sends the EAP authentication start message to trigger an access authentication process of the UE. In a practical application, if the MAC address of the AE is configured for the AP in advance, a destination address of the EAP authentication start message generated and sent by the AP is the MAC address of the AE; if the AP does not learn the MAC address of the AE at this time, a destination address of the EAP authentication start message generated and sent by the AP is a multicast address of a PAE, where the EAP authentication start message whose destination address is the multicast address of the PAE may be detected and received by the AE.

Correspondingly, the AE may receive the EAP authentication start message, and learn that the UE requests access authentication; and the AE may respond according to a standard authentication process.

430. The AP receives an EAP authentication message sent by the AE, where a source address of the EAP authentication message is the MAC address of the AE, and its destination address is the MAC address of the UE.

440. The AP forwards the EAP authentication message to the UE, so that the UE learns the MAC address of the AE from the EAP authentication message; or modifies the source address of the EAP authentication message to be a MAC address (such as a BSSID) corresponding to an air interface of the AP and forwards the EAP authentication message with the modified source address to the UE.

After receiving the EAP authentication start message, the AE may start an access authentication process for the UE, and communicate with the UE about other EAP authentication messages.

In an application scenario, if the AP receives an EAP authentication message (such as an EAP request message (EAP-Request message) for requesting the identity of a UE or another message) sent by the AE, where a source address of the EAP authentication message is the MAC address of the AE, and its destination address is the MAC address of the UE, the AP may modify the source address of the EAP authentication message to be the MAC address (such as a BSSID) corresponding to the air interface of the AP, and forward the EAP authentication message with the modified source address to the UE. In this case, because the source address of the EAP authentication message that is forwarded by the AP and received by the UE is the MAC address (such as a BSSID) corresponding to the air interface of the AP, the UE may still use the AP as an AE to continue the EAP authentication. Subsequently, if the AP further receives another EAP authentication message sent by the UE, where the EAP authentication message is an authentication message (for example, an EAP-Response message carrying a UE identity (ID) or another EAP authentication message) sent by the UE except an EAP authentication start message, its destination address of the EAP authentication message is the MAC address (such as a BSSID) corresponding to the air interface of the AP, and its source address is the MAC address of the UE, the AP may modify the destination address of the EAP authentication message to be the MAC address of the AE, and forward the EAP authentication message whose destination address is modified. In other words, the AP may modify source addresses or destination addresses of all EAP authentication messages communicated between the UE and the AE, modify the destination address of the EAP authentication message from the UE to be the MAC address of the AE, and modify the source address of the EAP authentication message from the AE to be the MAC address (such as a BSSID) corresponding to the air interface of the AP; and the UE may always regard the AP as an AE for EAP authentication. Therefore, the UE may send all EAP authentication messages in unicast mode according to the specification of the IEEE 802.1X protocol.

In another application scenario, subsequently, if the AP further receives an EAP authentication message (such as an EAP-Request message for requesting the identity of a UE or another message) sent by the AE, where a source address of the EAP authentication message is the MAC address of the AE, and its destination address is the MAC address of the UE, the AP may not modify the source address or destination address of the EAP authentication message from the AE, but directly forward the EAP authentication message to the UE, so that the UE learns the MAC address of the AE from the EAP authentication message. In this scenario, after receiving the EAP authentication message, the UE may learn the MAC address of an actual AE, and may communicate with the AE about other EAP authentication messages by using the learned MAC address of the AE subsequently, thereby completing the access authentication. In other words, after the AP acts a proxy for the UE to generate and send the EAP authentication start message (where the destination address is the multicast address of the PAE or the MAC address of the AE, and the source address is the MAC address of the UE), to initiate the access authentication for the UE, the AP may not modify a source address or destination address of an EAP authentication start message communicated subsequently between the UE and the AE; and the UE may learn the MAC address of the AE according to a response of the AE to the EAP authentication start message. Therefore, the UE may send all EAP authentication messages in unicast mode according to the specification of the IEEE 802.1X protocol.

It should be noted that the UE mentioned in the embodiment of the present invention may be various terminal devices having wireless local area network access capacity, such as a mobile phone and a portable computer; and the AP may be various devices having a wireless access function. The solution according to the embodiment of the present invention mainly involves intermediate processing performed by the AP on partial or all EAP authentication messages communicated between the UE and the AE, and an authentication signaling message communicated between the AE and an AS may be the same as or similar to a standard process. It may be understood that under 802.1X authentication architecture, various EAP authentication algorithms (for example, authentication algorithms such as EAP-PEAP, EAP-SIM/AKA, and EAP-TLS) may be selected according to requirements. However, authentication under the authentication architecture of 802.1X is not affected by different EAP authentication algorithms.

According to the above description, in the embodiment, an AP in centralized authentication deployment generates and sends an EAP authentication start message whose source address is a MAC address of a UE and whose destination address is a MAC address of an AE, to act as a proxy for the UE to initiate an access authentication process, so that the EAP authentication start message may reach the AE, so as to trigger an access authentication process for the UE and implement centralized 802.1X authentication for the UE in a wireless local area network. Further, this mechanism allows a UE to send all EAP authentication messages in unicast mode according to the specification of the IEEE 802.1X protocol; therefore, it is unnecessary to modify an authentication program that is built in the UE and based on the IEEE 802.1X protocol mechanism.

Embodiment 3

In order to illustrate the technical solutions according to embodiments of the present invention more clearly, the following detailed description is provided mainly by using a process of performing access authentication for a UE-1 by using an EAP-TLS authentication algorithm as an example.

Figure 5:
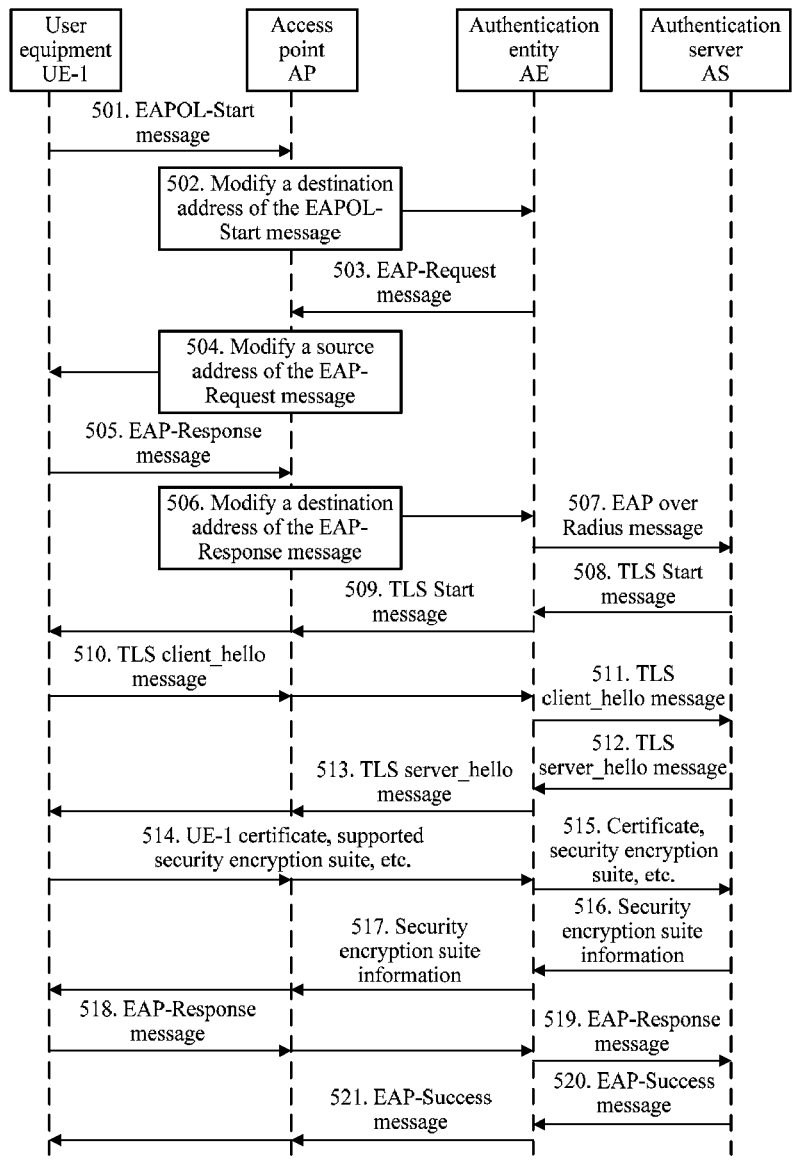
FIG. 5 is a schematic flowchart of a method for centralized 802.1X authentication in a wireless local area network according to Embodiment 3 of the present invention.

As shown in FIG. 5, the following specific steps may be included.

501. A UE-1 sends an EAPOL-Start message to start 802.1X authentication.

A destination address of the EAPOL-Start message is a MAC address (such as a BSSID) corresponding to an air interface of an AP, and its source address is a MAC address of the UE-1.

502. The AP receives the EAPOL-Start message from the UE-1, modifies the destination address of the EAPOL-Start message to be a MAC address of an AE or a multicast address of a PAE, and forwards the EAPOL-Start message whose destination address is modified.

In a practical application, if the MAC address of the AE is configured for the AP in advance, the AP may modify the destination address of the EAPOL-Start message to be the MAC address of the AE; if the AP does not learn the MAC address of the AE at this time, the AP may modify the destination address of the EAPOL-Start message to be a multicast address of a PAE, where the EAPOL-Start message whose destination address is the multicast address of the PAE may also be detected and received by the AE.

503. The AE receives the EAPOL-Start message whose destination address is modified by the AP, and feeds back an EAP-Request message to request the identity of the UE-1.

A source address of the EAP-Request message is the MAC address of the AE, and its destination address is the MAC address of the UE-1.

504. The AP receives the EAP-Request message from the AE, modifies the source address of the EAP-Request message to be the MAC address (such as a BSSID) corresponding to the air interface of the AP, and forwards the EAP-Request message with the modified source address.

505. The UE-1 receives the EAP-Request message whose source address is modified by the AP, and learns that the network side requests identity recognition, and then the UE-1 sends an EAP response (EAP-Response) message to the AP, where information such as the identity ID of the UE-1 is carried therein.

Because the AP modified the source address of the EAP-Request message from the AE, the UE-1 still regards the AP as the AE to continue the authentication process. A destination address of the EAP-Response message sent by the UE-1 is the MAC address (such as a BSSID) corresponding to the air interface of the AP, and its source address is the MAC address of the UE-1.

506. The AP receives the EAP-Response message from the UE-1, modifies the destination address of the EAP-Response message to be the MAC address of the AE, and forwards the EAP-Response message whose destination address is modified to the AE.

507. The AE sends an EAP over Radius message to an AS, where the EAP-Response message and the identity ID of the UE-1 are carried in the EAP over Radius message.

508. The AS identifies the UE-1, and sends an EAP-Request (TLS Start) message to the AE, which indicates that an EAP authentication algorithm is EAP-TLS, to start EAP authentication. If the AS selects another EAP authentication algorithm, the EAP-Request (TLS Start) message may correspondingly indicate a corresponding algorithm.

509. The AE transmits the TLS Start message to the UE-1 through the AP.

510. The UE-1 sends a TLS client hello message to the AE through the AP, to respond to the TLS Start message.

511. The AE transmits the TLS client hello message to the AS.

512. The AS sends a TLS server hello message to the AE, where the message may include an AS certificate, key exchange information, and a security encryption suite supported by the AS, and requests a certificate of the UE-1.

513. The AE transmits the TLS server hello message to the UE-1 through the AP.

514. The UE-1 verifies the AS certificate, and sends a message carrying an authentication result, a certificate of the UE-1, key exchange information, and a security encryption suite supported by the UE-1 to the AE through the AP.

515. The AE transmits the message to the AS.

516. After the authentication is successful, the AS sends a message carrying a security encryption suite selected by the AS to the AE.

517. The AE transmits the message to the UE-1 through the AP.

518. The UE-1 sends an EAP-Response message to the AE through the AP.

519. The AE transmits the EAP-Response message to the AS.

520. The AS sends an EAP success (EAP-Success) message to the AE, indicating that the authentication is successful.

521. The AE transmits the EAP-Success to the UE-1 through the AP, so that the UE-1 learns that the authentication is successful.

It should be noted that in step 504, if after receiving the EAP-Request message from the AE, the AP does not modify the source address of the message (the MAC address of the AE), but directly forwards the EAP-Request message to the UE-1, so that the UE-1 may learn the MAC address of the AE from the EAP authentication message, the UE-1 may obtain the MAC address of the AE, and subsequently, the UE-1 may communicate with the AE about other EAP authentication messages by using the learned MAC address of the AE to complete the access authentication. In other words, the AP may only modify the destination address of the EAPOL-Start message from the UE-1, but not modify the source address or destination address of an EAP authentication message communicated between the UE-1 and the AE subsequently; and the UE-1 may learn the MAC address of the AE according to a response of the AE to the EAP authentication start message, so that the UE-1 may send all EAP authentication messages in unicast mode according to the specification of the IEEE 802.1X protocol. Of course, the EAP over RADIUS message communicated between the AE and the AS does not need to be modified.

It should be noted that the embodiment is described by mainly taking a process of performing access authentication for the UE-1 based on an EAP-TLS authentication algorithm for an example. Of course, an authentication algorithm such as EAP-PEAP or EAP-SIM/AKA may also be selected to perform access authentication for the UE-1, where an application process thereof is the same and details are not repeated herein.

According to the above description, in the embodiment, centralized 802.1X authentication in a wireless local area network is implemented by detecting and relaying an EAPOL message by an AP in centralized authentication deployment. After receiving, from a UE, an EAP authentication start message whose destination address is a MAC address (such as a BSSID) corresponding to an air interface of the AP, the AP modifies the destination address of the message to be a MAC address of an AE, and forwards the EAP authentication start message whose destination address is modified, so that the EAP authentication start message may reach the AE instead of being stopped at the AP, so as to trigger an access authentication process for the UE and implement centralized 802.1X authentication for the UE in a wireless local area network. Further, this mechanism allows the UE to send all EAP authentication messages in unicast mode according to the specification of the IEEE 802.1X protocol; therefore, it is unnecessary to modify an authentication program that is built in the UE and based on the IEEE 802.1X protocol mechanism.

Embodiment 4

In order to illustrate the technical solutions according to the embodiments of the present invention more clearly, a process of performing access authentication for a UE-1 based on an EAP-TLS authentication algorithm is taken as an example for detailed description in the following. The embodiment uses an example where an AP acts as a proxy of a UE-1 to initiate access authentication.

Figure 6:
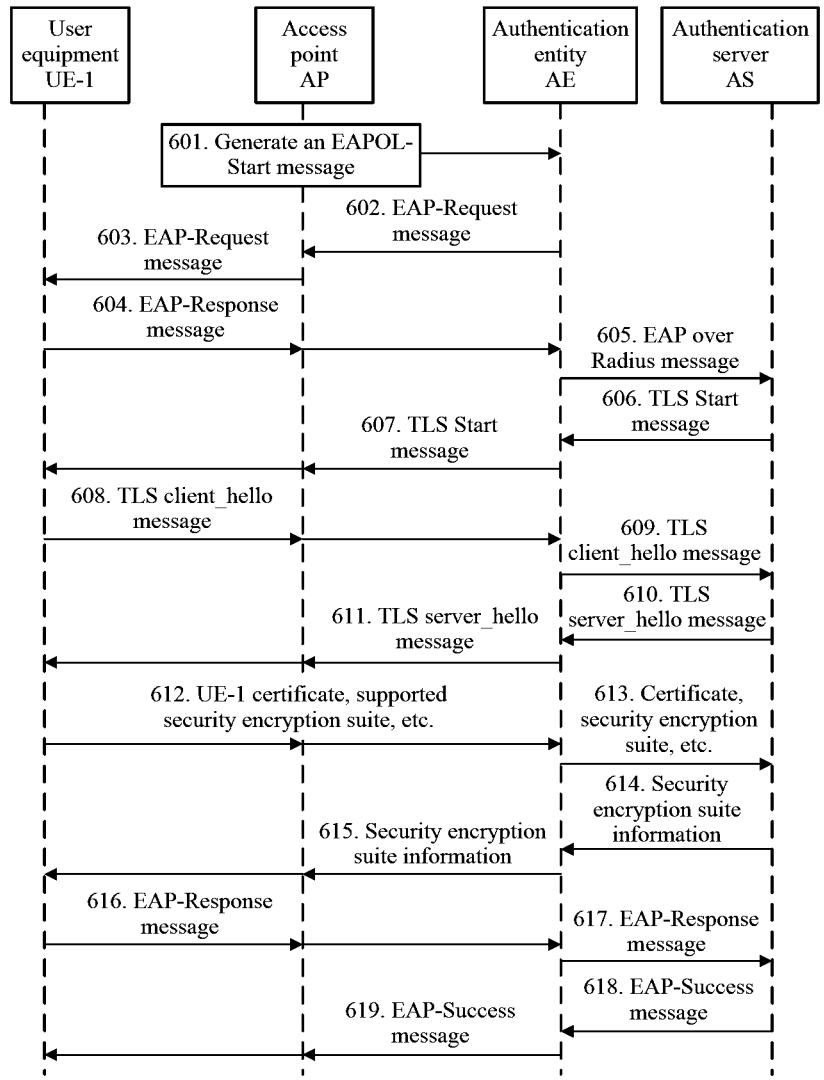
FIG. 6 is a schematic flowchart of a method for centralized 802.1X authentication in a wireless local area network according to Embodiment 4 of the present invention.

As shown in FIG. 6, the following specific steps may be included.

601. An AP generates and sends an EAPOL-Start message.

A destination address of the EAPOL-Start message is a MAC address (such as BSSID) of an AE or a multicast address of a PAE, and its source address is a MAC address of a UE-1.

In some application scenarios, a UE-1 does not actively initiate 802.1X authentication after being associated with an AP. That is, it does not actively send an EAPOL-Start message. In this case, the AP may send an EAPOL-Start message as a proxy of the UE-1 to the AE, to trigger 802.1X authentication.

In a practical application, if the MAC address of the AE is configured for the AP in advance, the AP may set the destination address of the EAPOL-Start message to be the MAC address of the AE; if the AP does not learn the MAC address of the AE at this time, the AP may set the destination address of the EAPOL-Start message to be a multicast address of a PAE, where the EAPOL-Start message whose destination address is the multicast address of the PAE may also be detected and received by the AE.

602. The AE receives the EAPOL-Start message from the AP, and feeds back an EAP-Request message to request the identity a UE-1, where a source address of the EAP-Request message is the MAC address of the AE, and its destination address is a MAC address of the UE-1.

603. The AP receives the EAP-Request message from the AE, and forwards the EAP-Request message to the UE-1.

604. The UE-1 receives the EAP-Request message, and learns that a network side requests identity recognition, and then the UE-1 sends an EAP-Response message to the AE through the AP, where information such as identity ID is carried in the response message.

Because the AP modified the source address of the EAP-Request message from the AE, the UE-1 may learn the MAC address of the AE; and subsequently, the UE-1 may communicate with the AE about other EAP authentication messages by using the learned MAC address of the AE to complete access authentication.

605. The AE receives the EAP-Response message forwarded by the AP, and sends an EAP over Radius message to an AS, where the EAP-Response message and the identity ID of the UE-1 are carried in the EAP over Radius message.

606. The AS identifies the UE-1, and sends an EAP-Request (TLS Start) message to the AE, which indicates that an EAP authentication algorithm is EAP-TLS, to start EAP authentication. If the AS selects another EAP authentication algorithm, the EAP-Request (TLS Start) message may correspondingly indicate a corresponding algorithm.

607. The AE transmits the TLS Start message to the UE-1 through the AP.

608. The UE-1 sends a TLS client hello message to the AE through the AP, to respond to the TLS Start message.

609. The AE transmits the TLS client hello message to the AS.

610. The AS sends a TLS server hello message to the AE, where the message may include an AS certificate, key exchange information, and a security encryption suite supported by the AS, and requests a certificate of the UE-1.

611. The AE transmits the TLS server hello message to the UE-1 through the AP.

612. The UE-1 verifies the AS certificate, and sends a message carrying an authentication result, a certificate of the UE-1, key exchange information, and a security encryption suite supported by the UE-1 to the AE through the AP.

613. The AE transmits the message to the AS.

614. After the authentication is successful, the AS sends a message carrying a security encryption suite selected by the AS to the AE.

615. The AE transmits the message to the UE-1 through the AP.

616. The UE-1 sends an EAP-Response message to the AE through the AP.

617. The AE transmits the EAP-Response message to the AS.

618. The AS sends an EAP-Success message to the AE, indicating that the authentication is successful.

619. The AE transmits the EAP-Success to the UE-1 through the AP, so that the UE-1 learns that the authentication is successful.

It should be noted that in step 603, if after receiving the EAP-Request message from the AE, the AP modifies the source address thereof (the MAC address of the AE) to be a MAC address (such as a BSSID) corresponding to an air interface of the AP, the UE-1 may still regard the AP as an AE to continue the authentication process, and subsequently, the AP still processes an EAP-Start message communicated between the UE-1 and the AE according to the method in the embodiment 3. Of course, the EAP over RADIUS message communicated between the AE and the AS does not need to be modified.

It should be noted that the embodiment is described by mainly taking a process of performing access authentication for the UE-1 based on an EAP-TLS authentication algorithm for an example. Of course, an authentication algorithm such as EAP-PEAP or EAP-SIM/AKA may also be selected to perform access authentication for the UE-1, where an application process thereof is the same and details are not repeated herein.

According to the above description, in the embodiment, an AP in centralized authentication deployment generates and sends an EAP authentication start message whose source address is a MAC address of a UE and whose destination address is a MAC address of an AE, to act as a proxy for the UE to initiate an access authentication process, so that the EAP authentication start message may reach the AE, so as to trigger an access authentication process for the UE and implement centralized 802.1X authentication for the UE in a wireless local area network. Further, this mechanism allows a UE to send all EAP authentication messages in unicast mode according to the specification of the IEEE 802.1X protocol; therefore, it is unnecessary to modify an authentication program that is built in the UE and based on the IEEE 802.1X protocol mechanism.

In order to better implement the above method according to the embodiments of the present invention, the embodiments of the present invention further provide a relevant apparatus and system for implementing the above method.

Figure 7:
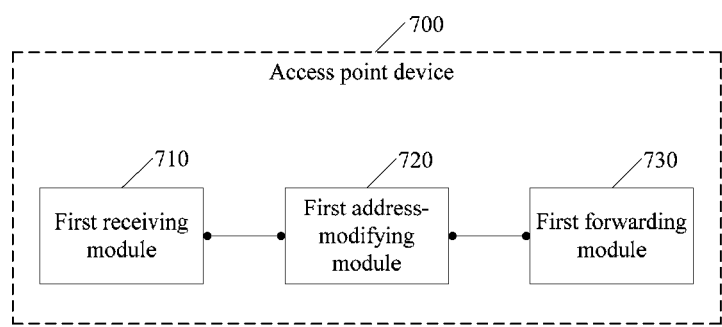
FIG. 7 is a schematic diagram of an access point according to an embodiment of the present invention.

As sown in FIG. 7, an access point device 700 according to an embodiment of the present invention may include a first receiving module 710, a first address-modifying module 720, and a first forwarding module 730, where the first receiving module 710 is configured to receive an EAP authentication start message sent by a UE, where a destination address of the EAP authentication start message is a MAC address corresponding to an air interface of the access point device 700, and its source address is a MAC address of the UE;

the first address-modifying module 720 is configured to modify the destination address of the EAP authentication start message received by the first receiving module 710 to be a multicast address of a PAE or a MAC address of an AE; and the first forwarding module 730 is configured to forward the EAP authentication start message whose destination address is modified by the first address-modifying module 720, so that the AE starts access authentication for the UE according to the EAP authentication start message whose destination address is modified.

In an application scenario, the access point AP device 700 may further include a second receiving module, a second address-modifying module, and a second forwarding module (not shown in FIG. 7), where the second receiving module is configured to receive an EAP authentication message sent by the AE, where a source address of the EAP authentication message is the MAC address of the AE, and its destination address is the MAC address of the UE;

the second address-modifying module is configured to modify the source address of the EAP authentication message received by the second receiving module to be the MAC address corresponding to the air interface of the access point device 700; and the second forwarding module is configured to forward the EAP authentication message whose source address is modified by the second address-modifying module to the UE.

In an application scenario, the first receiving module 710 is further configured to receive a second EAP authentication message sent by the UE, where the second EAP authentication message is an authentication message sent by the UE except the EAP authentication start message, a destination address of the second EAP authentication message is the MAC address corresponding to the air interface of the access point device 700, and its source address is the MAC address of the UE.

The first address-modifying module 720 is further configured to modify the destination address of the second EAP authentication message received by the first receiving module to be the MAC address of the AE.

The first forwarding module 730 is further configured to forward the second EAP authentication message whose destination address is modified by the first address-modifying module.

In an application scenario, the access point device 700 may further include a third receiving module and a third forwarding module (not shown in FIG. 7), where the third receiving module is configured to receive a third EAP authentication message sent by the AE, where a source address of the third EAP authentication message is the MAC address of the AE, and its destination address is the MAC address of the UE; and the third forwarding module is configured to forward, to the UE, the third EAP authentication message received by the third receiving module, so that the UE learns the MAC address of the AE from the third EAP authentication message.

It should be noted that the access point device 700 in the embodiment may be the access point device in the above method embodiment 1 or embodiment 3, and may be used to assist in implementing all technical solutions in the above method embodiment 1 or embodiment 3, functions of functional modules thereof may be specifically implemented according to the method in the above method embodiments, and reference may be made to relevant description in the above embodiments for specific implementation processes thereof, and details are not repeated herein.

According to the above description, after the access point 700 in centralized authentication deployment according to the embodiment receives, from a UE, an EAP authentication start message whose destination address is a MAC address (such as a BSSID) corresponding to an air interface of the access point 700, the access point 700 modifies the destination address of the message to be a MAC address of an AE, and forwards the EAP authentication start message whose destination address is modified, so that the EAP authentication start message may reach the AE instead of being stopped at the access point 700, so as to trigger an access authentication process for the UE and implement centralized 802.1X authentication for the UE in a wireless local area network. Further, this mechanism allows the UE to send all EAP authentication messages in unicast mode according to the specification of the IEEE 802.1X protocol; therefore, it is unnecessary to modify an authentication program that is built in the UE and based on the IEEE 802.1X protocol mechanism.

Figure 8:
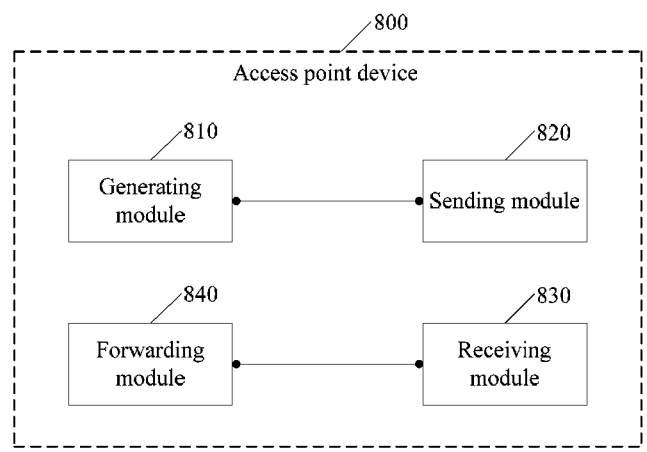
FIG. 8 is a schematic diagram of another access point according to an embodiment of the present invention.

As shown in FIG. 8, an access point device 800 according to an embodiment of the present invention may include:

a generating module 810, configured to generate an EAP authentication start message, where a destination address of the EAP authentication start message is a multicast address of a PAE or a MAC address of an AE, and its source address is a MAC address of a UE;

a sending module 820, configured to send the EAP authentication start message generated by the generating module 810;

a receiving module 830, configured to receive an EAP authentication message sent by the AE, where a source address of the EAP authentication message is the MAC address of the AE, and its destination address is the MAC address of the UE; and a forwarding module 840, configured to forward the EAP authentication message received by the receiving module 830 to the UE, so that the UE learns the MAC address of the AE from the EAP authentication message.

In an application scenario, subsequently, if the access point 800 further receives an EAP authentication message (such as an EAP-Request message for requesting the identity of a UE or another message) sent by the AE, where a source address of the EAP authentication message is the MAC address of the AE, and its destination address is the MAC address of the UE, the access point 800 may not modify the source address or destination address of the EAP authentication message from the AE, but directly forward the EAP authentication message to the UE, so that the UE learns the MAC address of the AE from the EAP authentication message. In this scenario, after receiving the EAP authentication message, the UE may learn the MAC address of an actual AE, and may communicate with the AE about other EAP authentication messages by using the learned MAC address of the AE subsequently, thereby completing the access authentication. In other words, after the access point 800 acts as a proxy for the UE to generate and send the EAP authentication start message (where the destination address is the multicast address of the PAE or the MAC address of the AE, and the source address is the MAC address of the UE), to initiate the access authentication for the UE, the access point 800 may not modify a source address or destination address of an EAP authentication start message communicated subsequently between the UE and the AE; and the UE may learn the MAC address of the AE according to a response of the AE to the EAP authentication start message. Therefore, the UE may send all EAP authentication messages in unicast mode according to the specification of the IEEE 802.1X protocol.

It should be noted that the access point device 800 in the embodiment may be the access point device in the above method embodiment 2 or embodiment 4, and may be used to assist in implementing all technical solutions in the above method embodiment 2 or embodiment 4, functions of functional modules thereof may be specifically implemented according to the method in the above method embodiments, and reference may be made to relevant description in the above embodiments for specific implementation processes thereof, and details are not repeated herein.

According to the above description, in the embodiment, an access point 800 in centralized authentication deployment generates and sends an EAP authentication start message whose source address is a MAC address of a UE and whose destination address is a MAC address of an AE, to act as a proxy for the UE to initiate an access authentication process, so that the EAP authentication start message may reach the AE, so as to trigger an access authentication process for the UE and implement centralized 802.1X authentication for the UE in a wireless local area network. Further, this mechanism allows a UE to send all EAP authentication messages in unicast mode according to the specification of the IEEE 802.1X protocol; therefore, it is unnecessary to modify an authentication program that is built in the UE and based on the IEEE 802.1X protocol mechanism.

Figure 9:
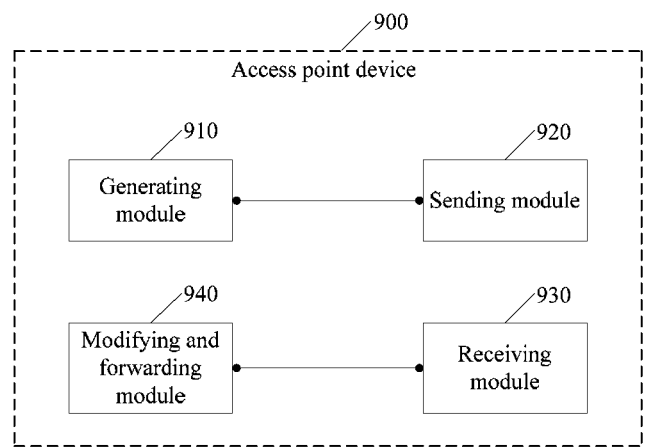
FIG. 9 is a schematic diagram of another access point according to an embodiment of the present invention.

As shown in FIG. 9, an access point device 900 according to an embodiment of the present invention may include:

a generating module 910, configured to generate an EAP authentication start message, where a destination address of the EAP authentication start message is a multicast address of a PAE or a MAC address of an AE, and its source address is a MAC address of a UE;

a sending module 920, configured to send the EAP authentication start message generated by the generating module 910;

a receiving module 930, configured to receive an EAP authentication message sent by the AE, where a source address of the EAP authentication message is the MAC address of the AE, and its destination address is the MAC address of the UE; and a modifying and forwarding module 940, configured to modify the source address of the EAP authentication message received by the receiving module 930 to be a MAC address (such as a BSSID) corresponding to an air interface of the access point 900, and forward the EAP authentication message with the modified source address to the UE.

In an application scenario, if the access point 900 receives an EAP authentication message (for example, the EAP authentication message is an EAP request message (EAP-Request message) for requesting the identity of a UE or another message) sent by the AE, where a source address of the EAP authentication message is a MAC address of the AE, its destination address is a MAC address of a UE, the access point 900 may modify the source address of the EAP authentication message to be a MAC address of the access point 900, and forward the EAP authentication message with the modified source address to the UE. In this case, because the source address of the EAP authentication message that is forwarded by the access point 900 and is received by the UE is the MAC address (such as a BSSID) corresponding to an air interface of the access point 900, the UE may still use the access point 900 as an AE to continue EAP authentication. Subsequently, if the access point 900 further receives another EAP authentication message sent by the UE, where the EAP authentication message is an authentication message (for example, an EAP-Response message carrying a UE identity (ID) or another EAP authentication message) sent by the UE except the EAP authentication start message, a destination address of the EAP authentication message is the MAC address (such as a BSSID) corresponding to the air interface of the access point 900, and its source address is the MAC address of the UE, the access point 900 may modify the destination address of the EAP authentication message to be the MAC address of the AE, and forward the EAP authentication message whose destination address is modified. In other words, the AP may modify source addresses or destination addresses of all EAP authentication messages communicated between the UE and the AE, modify the destination address of the EAP authentication message from the UE to be the MAC address of the AE, and modify the source address of the EAP authentication message from the AE to be the MAC address of the access point 900; and the UE may always regard the access point 900 as an AE for EAP authentication. Therefore, the UE may send all EAP authentication messages in unicast mode according to the specification of the IEEE 802.1X protocol.

It should be noted that the access point device 900 in the embodiment may be the access point device in the above method embodiment 2 or embodiment 4, and may be used to assist in implementing all technical solutions in the above method embodiment 2 or embodiment 4, functions of functional modules thereof may be specifically implemented according to the method in the above method embodiments, and reference may be made to relevant description in the above embodiments for specific implementation processes thereof, and details are not repeated herein.

According to the above description, in the embodiment, an access point 900 in centralized authentication deployment generates and sends an EAP authentication start message whose source address is a MAC address of a UE and whose destination address is a MAC address of an AE, to act as a proxy for the UE to initiate an access authentication process, so that the EAP authentication start message may reach the AE, so as to trigger an access authentication process for the UE and implement centralized 802.1X authentication for the UE in a wireless local area network. Further, this mechanism allows a UE to send all EAP authentication messages in unicast mode according to the specification of the IEEE 802.1X protocol; therefore, it is unnecessary to modify an authentication program that is built in the UE and based on the IEEE 802.1X protocol mechanism.

Figure 10:
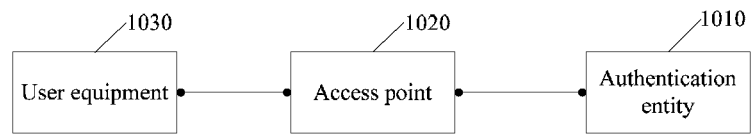
FIG. 10 is a schematic diagram of a system for centralized 802.1X authentication in a wireless local area network according to an embodiment of the present invention.

As shown in FIG. 10, an embodiment of the present invention provides a system for centralized 802.1X authentication in a wireless local area network, where a wireless local area network includes an authentication entity 1010, an access point 1020, and at least one user equipment 1030, and the authentication entity 1010 is connected to the at least one user equipment 1030 through the access point 1020, where the access point 1020 is configured to receive an extensive authentication protocol EAP authentication start message sent by the user equipment 1030, where a destination address of the EAP authentication start message is a media access control MAC address of the access point 1020, and its source address is a MAC address of the user equipment 1030; modify the destination address of the EAP authentication start message to be a multicast address of a port access entity or a MAC address of the authentication entity 1010; and forward the EAP authentication start message whose destination address is modified, so that the authentication entity 1010 starts access authentication for the user equipment 1030 according to the EAP authentication start message whose destination address is modified.

In an application scenario, if the access point 1020 further receives an EAP authentication message (such as an EAP-Request message for requesting the identity of the user equipment 1030 or another message) sent by the authentication entity 1010, where a source address of the EAP authentication message is the MAC address of the authentication entity 1010, and its destination address is the MAC address of the user equipment 1030, the access point may modify the source address of the EAP authentication message to be the MAC address (such as a BSSID) corresponding to the air interface of the access point, and forward the EAP authentication message with the modified source address to the user equipment 1030. In this case, because the source address of the EAP authentication message that is forwarded by the access point 1020 and is received by the user equipment 1030 is the MAC address of the access point 1020, the user equipment 1030 may still regard the access point 1020 as an AE to continue EAP authentication. If the access point 1020 further receives a second EAP authentication message sent by the user equipment 1030, where the second EAP authentication message is an authentication message sent by the user equipment 1030 except the EAP authentication start message (the second EAP authentication message is, for example, an EAP-Response message carrying the identity (ID) of the user equipment 1030 or another EAP authentication message), a destination address of the second EAP authentication message is the MAC address (such as a BSSID) corresponding to the air interface of the access point 1020, and its source address is the MAC address of the user equipment 1030, the access point 1020 may modify the destination address of the second EAP authentication message to be the MAC address of the authentication entity 1010, and forward the second EAP authentication message whose destination address is modified. In other words, the access point 1020 may modify source addresses or destination addresses of all EAP authentication messages communicated between the user equipment 1030 and the authentication entity 1010, modify a destination address of an EAP authentication message from the user equipment 1030 to the MAC address of the authentication entity 1010, and modify a source address of an EAP authentication message from the authentication entity 1010 to be the MAC address of the access point 1020; and the user equipment 1030 may always regard the access point 1020 as an AE for EAP authentication. Because the user equipment 1030 learns the MAC address of the access point 1020 before the authentication, the user equipment 1030 may send all EAP authentication messages in unicast mode according to the specification of the IEEE 802.1X protocol.

In another application scenario, if the access point 1020 further receives a third EAP authentication message (such as an EAP-Request message for requesting the identity of the user equipment 1030 or another message) sent by the authentication entity 1010, where a source address of the third EAP authentication message is the MAC address of the authentication entity 1010, and its destination address is the MAC address of the user equipment 1030, the access point 1020 may not modify the source address or destination address of the third EAP authentication message, but directly forward the third EAP authentication message to the user equipment 1030, so that the user equipment 1030 may learn the MAC address of the authentication entity 1010 from the third EAP authentication message. In this scenario, after receiving the third EAP authentication message, the user equipment 1030 may learn the MAC address of an actual authentication entity, and may communicate with the authentication entity 1010 about other EAP authentication messages by using the learned MAC address of the authentication entity 1010 subsequently, thereby completing the access authentication. In other words, the access point 1020 may only modify the destination address of the EAP authentication start message (a first EAP authentication message from the user equipment 1030), but not modify the source address or destination address of an EAP authentication start message communicated subsequently between the user equipment 1030 and the authentication entity 1010; and the user equipment 1030 may learn the MAC address of the authentication entity 1010 according to a response of the authentication entity 1010 to the EAP authentication start message, so that the user equipment 1030 may send all EAP authentication messages in unicast mode according to the specification of the IEEE 802.1X protocol.

In an application scenario, the access point 1020 may further be configured to generate an EAP authentication start message, where a destination address of the EAP authentication start message is a multicast address of a port access entity or a MAC address of the authentication entity 1010, and its source address is a MAC address of a second user equipment (not shown in FIG. 10); send the EAP authentication start message; receive an EAP authentication message sent by the authentication entity 1010, where a source address of the EAP authentication message is the MAC address of the authentication entity 1010, and its destination address is the MAC address of the second user equipment; and modify the source address of the EAP authentication message to be a MAC address corresponding to an air interface of the access point 1020, and forward the EAP authentication message with the modified source address to the second user equipment.

It should be noted that the access point 1020 in the embodiment may be the access point device in the above method embodiment 1 or embodiment 3, and may be used to assist in implementing all technical solutions in the above method embodiment 1 or embodiment 3, functions of functional modules thereof may be specifically implemented according to the method in the above method embodiments, and reference may be made to relevant description in the above embodiments for specific implementation processes thereof, and details are not repeated herein.

Figure 11:
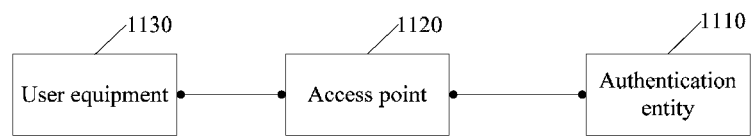
FIG. 11 is a schematic diagram of another system for centralized 802.1X authentication in a wireless local area network according to an embodiment of the present invention.

As shown in FIG. 11, an embodiment of the present invention provides a system for centralized 802.1X authentication in a wireless local area network, where a wireless local area network includes an authentication entity 1110, an access point 1120, and at least one user equipment 1130, and the authentication entity 1110 is connected to the at least one user equipment 1120 through the access point 1130, where the access point 1120 is configured to generate an EAP authentication start message, where a destination address of the EAP authentication start message is a multicast address of a port access entity or a MAC address of the authentication entity 1110, and its source address is a MAC address of the UE; send the EAP authentication start message; receive an EAP authentication message sent by the authentication entity 1110, where a source address of the EAP authentication message is the MAC address of the authentication entity 1110, and its destination address is the MAC address of the user equipment 1130; and forward the EAP authentication message to the user equipment 1130, so that the user equipment 1130 learns the MAC address of the authentication entity from the EAP authentication message; or modify the source address of the EAP authentication message to be a MAC address (such as a BSSID) corresponding to an air interface of the access point 1120, and forward the EAP authentication message with the modified source address to the user equipment 1130.

In an application scenario, if the access point 1120 receives an EAP authentication message (such as an EAP request message (EAP-Request message) for requesting the identity of the user equipment 1130 or another message) sent by the authentication entity 1110, where a source address of the EAP authentication message is the MAC address of the AE, and its destination address is the MAC address of the user equipment 1130, the access point 1120 may modify the source address of the EAP authentication message to be the MAC address of the access point 1120, and forward the EAP authentication message with the modified source address to the user equipment 1130. In this case, because the source address of the EAP authentication message that is forwarded by the access point 1120 and is received by the user equipment 1130 is the MAC address (such as a BSSID) corresponding to an air interface of the access point, the user equipment 1130 may still regard the access point 1120 as an AE to continue EAP authentication. Subsequently, if the access point 1120 further receives another EAP authentication message sent by the UE, where the EAP authentication message is an authentication message (for example, an EAP-Response message carrying the identity (ID) of the user equipment 1130 or another EAP authentication message) sent by the user equipment 1130 except the EAP authentication start message, a destination address of the EAP authentication message is the MAC address (such as a BSSID) corresponding to the air interface of the access point, and its source address is the MAC address of the user equipment 1130, the access point 1120 may modify the destination address of the EAP authentication message to be the MAC address of the authentication entity 1110, and forward the EAP authentication message whose destination address is modified. In other words, the access point 1120 may modify source addresses or destination addresses of all EAP authentication messages communicated between the user equipment 1130 and the authentication entity 1110, modify a destination address of an EAP authentication message from the user equipment 1130 to the MAC address of the authentication entity 1110, and modify a source address of an EAP authentication message from the authentication entity 1110 to be the MAC address of the access point 1120; and the UE may always regard the access point 1120 as an AE for EAP authentication. Therefore, the user equipment 1130 may send all EAP authentication messages in unicast mode according to the specification of the IEEE 802.1X protocol.

In another application scenario, subsequently if the access point 1120 further receives an EAP authentication message (such as an EAP-Request message for requesting the identity of the user equipment 1130 or another message) sent by the authentication entity 1110, where a source address of the EAP authentication message is the MAC address of the authentication entity 1110, and its destination address is the MAC address of the user equipment 1130, the access point 1120 may not modify the source address or destination address of the EAP authentication message from the authentication entity 1110, but directly forward the EAP authentication message to the user equipment 1130, so that the user equipment 1130 learns the MAC address of the authentication entity 1110 from the EAP authentication message. In this scenario, after receiving the EAP authentication message, the user equipment 1130 may learn the MAC address of an actual authentication entity 1110, and may communicate with the authentication entity 1110 about other EAP authentication messages by using the learned MAC address of the authentication entity 1110 subsequently, thereby completing the access authentication. In other words, after the access point 1120 acts as a proxy for the user equipment 1130 to generate and send the EAP authentication start message (where the destination address is a multicast address of a port access entity or the MAC address of the authentication entity 1110, and the source address is the MAC address of the user equipment 1130), to initiate access authentication for the user equipment 1130, the access point 1120 may not modify a source address or destination address of an EAP authentication start message communicated subsequently between the user equipment 1130 and the authentication entity 1110; and the user equipment 1130 may learn the MAC address of the authentication entity 1110 according to a response of the authentication entity 1110 to the EAP authentication start message, so that the user equipment 1130 may send all EAP authentication messages in unicast mode according to the specification of the IEEE 802.1X protocol.

In an application scenario, the access point 1120 is further configured to: receive an extensive authentication protocol EAP authentication start message sent by a third user equipment, where a destination address of the EAP authentication start message is a media access control MAC address corresponding to an air interface of the access point 1120, and its source address is a MAC address of the third user equipment; modify the destination address of the EAP authentication start message to be the multicast address of the port access entity or the MAC address of the authentication entity 1110; and forward the EAP authentication start message whose destination address is modified, so that the authentication entity 1110 starts access authentication for the third user equipment according to the EAP authentication start message whose destination address is modified.

It should be noted that the access point 1120 in the embodiment may be the access point device in the above method embodiment 2 or embodiment 4, and may be used to assist in implementing all technical solutions in the above method embodiment 2 or embodiment 4, functions of functional modules thereof may be specifically implemented according to the method in the above method embodiments, and reference may be made to relevant description in the above embodiments for specific implementation processes thereof, and details are not repeated herein.

It should be noted that, for the purpose of brief description, each of the above method embodiments is described as a combination of a series of actions; however, persons skilled in the art should understand that the present invention is not limited by the sequence of the actions described because some steps may be performed in other sequences or simultaneously according to the present invention. In addition, persons skilled in the art should further understand that the embodiments described in the specification are preferred embodiments, and the actions and modules involved therein are not necessarily required for the present invention.

In the above embodiments, the embodiments emphasize different aspects, and for the part not described in detail in one embodiment, reference may be made to relevant description of other embodiments.

In conclusion, in a technical solution according to an embodiment of the present invention, after an AP in centralized authentication deployment receives, from a UE, an EAP authentication start message whose destination address is a MAC address (such as a BSSID) corresponding to an air interface of the AP, the AP modifies the destination address of the message to be a MAC address of an AE, and forwards the EAP authentication start message whose destination address is modified, so that the EAP authentication start message may reach the AE instead of being stopped at the AP, so as to trigger an access authentication process for the UE and implement centralized 802.1X authentication for the UE in a wireless local area network. Further, this mechanism allows the UE to send all EAP authentication messages in unicast mode according to the specification of the IEEE 802.1X protocol; therefore, it is unnecessary to modify an authentication program that is built in the UE and based on the IEEE 802.1X protocol mechanism.

In another technical solution provided by an embodiment of the present invention, an AP in centralized authentication deployment generates and sends an EAP authentication start message whose source address is a MAC address of a UE and whose destination address is a MAC address of an AE, to act as a proxy for the UE to initiate an access authentication process, so that the EAP authentication start message may reach an AE, so as to trigger an access authentication process for the UE and implement centralized 802.1X authentication for the UE in a wireless local area network. Further, this mechanism allows a UE to send all EAP authentication messages in unicast mode according to the specification of the IEEE 802.1X protocol; therefore, it is unnecessary to modify an authentication program that is built in the UE and based on the IEEE 802.1X protocol mechanism.

Persons of ordinary skill in the art may understand that all or part of the steps of the methods according to the embodiments may be implemented by a program instructing relevant hardware. The program may be stored in a computer readable storage medium, and the storage medium may include a read-only memory, a random access memory, a magnetic disk, or a CD-ROM.

A method, an apparatus, and a system for centralized 802.1X authentication in a wireless local area network according to the embodiments of the present invention are described in detail above. The principle and embodiments of the present invention are described by using specific examples herein. The above embodiments are described to help understand the method and the core idea of the present invention. Meanwhile, persons of ordinary skill in the art may make variations to the specific embodiments and application scope based on the idea of the present invention. Therefore, the content of the specification shall not be construed as a limitation to the present invention.

What is claimed is:

1. A method for centralized 802.1X authentication in a wireless local area network, wherein the wireless local area network comprises an authentication entity, an access point, and at least one user equipment (UE), the authentication entity is connected to the at least one UE through the access point, and the method comprises:

receiving, by the access point, an extensive authentication protocol (EAP) authentication start message from the UE, wherein a destination address of the EAP authentication start message is a media access control (MAC) address corresponding to an air interface of the access point, and a source address of the EAP authentication start message is a MAC address of the UE;

modifying, by the access point, only content of the destination address of the EAP authentication start message to be one of the group consisting of (a) a multicast address of a port access entity and (b) a MAC address of the authentication entity;

forwarding, by the access point, the EAP authentication start message whose destination address is modified, to the authentication entity, to enable the authentication entity to start access authentication for the UE according to the EAP authentication start message whose destination address is modified;

receiving a first EAP authentication message sent by the authentication entity, wherein a source address of the first EAP authentication message is the MAC address of the authentication entity, and a destination address of the first EAP authentication message is the MAC address of the UE;

modifying the source address of the first EAP authentication message to be the MAC address corresponding to the air interface of the access point;

forwarding the first EAP authentication message with the modified source address of the first EAP authentication message to the UE;

receiving a second EAP authentication message sent by the UE wherein the second EAP authentication message is sent by the UE, but different from the EAP authentication start message, a destination address of the second EAP authentication message is the MAC address corresponding to the air interface of the access point and a source address of the second EAP authentication message is the MAC address of the UE;

modifying the destination address of the second EAP authentication message to be the MAC address of the authentication entity; and forwarding the second EAP authentication message whose destination address is modified.

2. The method according to claim 1, wherein the method further comprises:

receiving a third EAP authentication message sent by the authentication entity, wherein a source address of the third EAP authentication message is the MAC address of the authentication entity, and a destination address of the third EAP authentication message is the MAC address of the UE; and forwarding the third EAP authentication message to the UE, so that the UE learns the MAC address of the authentication entity from the third EAP authentication message.

3. A method for centralized 802.1X authentication in a wireless local area network, comprising:

generating, by an access point, an extensive authentication protocol (EAP) authentication start message, wherein a destination address of the EAP authentication start message is one of the group consisting of (a) a multicast address of a port access entity and (b) a media access control (MAC) address of an authentication entity, and a source address of the EAP authentication start message is a MAC address of a user equipment (UE);

sending, by the access point, the EAP authentication start message;

receiving a first EAP authentication message sent by the authentication entity, wherein a source address of the first EAP authentication message is the MAC address of the authentication entity, and a destination address of the first EAP authentication message is the MAC address of the UE;

modifying the source address of the first EAP authentication message to be the MAC address corresponding to an air interface of the access point;

forwarding the first EAP authentication message with the modified source address of the first EAP authentication message to the UE;

receiving a second EAP authentication message sent by the UE, wherein the second EAP authentication message is sent by the UE, which is different from the EAP authentication start message, a destination address of the second EAP authentication message is the MAC address corresponding to the air interface of the access point and a source address of the second EAP authentication message is the MAC address of the UE;

modifying the destination address of the second EAP authentication message to be the MAC address of the authentication entity; and forwarding the second EAP authentication message whose destination address is modified.

4. An access point device, comprising:

a first receiving module, configured to receive an extensive authentication protocol (EAP) authentication start message sent by a user equipment (UE), wherein a destination address of the EAP authentication start message is a media access control (MAC) address corresponding to an air interface of an access point, and a source address of the EAP authentication start message is a MAC address of the UE;
a first address-modifying module, configured to modify only the content the destination address of the EAP authentication start message received by the first receiving module to be one of the group consisting of (a) a multicast address of a port access entity and (b) a MAC address of an authentication entity; and
a first forwarding module, configured to forward the EAP authentication start message whose destination address is modified by the first address-modifying module to the authentication entity, to enable the authentication entity to start access authentication for the UE according to the EAP authentication start message whose destination address is modified;
a second receiving module, configured to receive a first EAP authentication message sent by the authentication entity, wherein a source address of the first EAP authentication message is the MAC address of the authentication entity and a destination address of the first EAP authentication message is the MAC address of the UE;
a second address-modifying module, configured to modify the source address of the EAP authentication message received by the second receiving module to be the MAC address corresponding to the air interface of the access point; and
a second forwarding module, configured to forward the EAP authentication message whose source address is modified by the second address-modifying module to the UE;
wherein the first receiving module is further configured to receive a second EAP authentication message sent by the UE wherein the second EAP authentication message is sent by the UE but different from the EAP authentication start message, a destination address of the second EAP authentication message is the MAC address corresponding to the air interface of the access point and a source address of the second EAP authentication message is the MAC address of the UE;
the first address-modifying module is further configured to modify the destination address of the second EAP authentication message received by the first receiving module to be the MAC address of the authentication entity; and
the first forwarding module is further configured to forward the second EAP authentication message whose destination address is modified by the first address-modifying module.

5. The access point device according to claim 4, further comprising: a third receiving module, configured to receive a third EAP authentication message sent by the authentication entity, wherein a source address of the third EAP authentication message is the MAC address of the authentication entity, and a destination address of the third EAP authentication message is the MAC address of the UE; and
a third forwarding module, configured to forward, to the UE, the third EAP authentication message received by the third receiving module, so that the UE learns the MAC address of the authentication entity from the third EAP authentication message.

6. A system for centralized 802.1X authentication in a wireless local area network, wherein the system comprises an authentication entity, an access point, and at least one user equipment (UE), the authentication entity is connected to the at least one UE through the access point, and
the access point is configured to: receive an extensive authentication protocol (EAP) authentication start message sent by the UE, wherein a destination address of the EAP authentication start message is a media access control (MAC) address corresponding to an air interface of the access point, and a source address of the EAP authentication start message is a MAC address of the UE; modify the destination address of the EAP authentication start message to be one of the group consisting of (a) a multicast address of a port access entity and (b) a MAC address of the authentication entity; and forward the EAP authentication start message whose destination address is modified, so that the authentication entity starts access authentication for the UE according to the EAP authentication start message whose destination address is modified;
the access point is further configured to: receive a first EAP authentication message sent by the authentication entity, wherein a source address of the first EAP authentication message is the MAC address of the authentication entity, and a destination address of the first EAP authentication message is the MAC address of the UE;
modify the source address of the first EAP authentication message to be the MAC address corresponding to the air interface of the access point;
forward the first EAP authentication message with the modified source address of the first EAP authentication message to the UE;
receive a second EAP authentication message sent by the UE wherein the second EAP authentication message is sent by the UE, but different from the EAP authentication start message, a destination address of the second EAP authentication message is the MAC address corresponding to the air interface of the access point and a source address of the second EAP authentication message is the MAC address of the UE;
modify the destination address of the second EAP authentication message to be the MAC address of the authentication entity; and
forward the second EAP authentication message whose destination address is modified.

* * * * *